US010360662B2

(12) United States Patent
Gao et al.

(10) Patent No.: US 10,360,662 B2
(45) Date of Patent: Jul. 23, 2019

(54) ALIGNMENT OF MULTIPLE CAMERA IMAGES BY MATCHING PROJECTED ONE DIMENSIONAL IMAGE PROFILES

(71) Applicant: OmniVision Technologies, Inc., Santa Clara, CA (US)

(72) Inventors: Xinting Gao, Singapore (SG); Shan Xu, Singapore (CN); Shimiao Li, Singapore (CN); Ying Zhou, Cupertino, CA (US); Guansong Liu, San Jose, CA (US); Lu Chang, Cupertino, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 96 days.

(21) Appl. No.: 15/785,239

(22) Filed: Oct. 16, 2017

(65) Prior Publication Data

US 2019/0114739 A1    Apr. 18, 2019

(51) Int. Cl.
| | | |
|---|---|---|
| *H04N 5/225* | (2006.01) | |
| *G06T 3/40* | (2006.01) | |
| *H04N 5/232* | (2006.01) | |
| *G06T 7/33* | (2017.01) | |
| *H04N 9/09* | (2006.01) | |

(52) U.S. Cl.
CPC ............ *G06T 3/4038* (2013.01); *G06T 7/344* (2017.01); *H04N 5/2258* (2013.01); *H04N 5/23229* (2013.01); *G06T 2200/32* (2013.01); *G06T 2207/10024* (2013.01); *H04N 9/09* (2013.01)

(58) Field of Classification Search
CPC ... G06T 3/4038; G06T 7/344; G06T 2200/32; G06T 2207/10024; H04N 5/23229; H04N 5/2258; H04N 9/09
See application file for complete search history.

(56) References Cited

U.S. PATENT DOCUMENTS

2016/0035104 A1    2/2016  Bigioi et al.

OTHER PUBLICATIONS

Filtered Projections as an Aid in Corner Detection; Computer Vision Laboratory Computer Science Center, University of Maryland College Park, MD 20742, Zhong-Quan Wu, Azriel Rosenfeld.
(Continued)

*Primary Examiner* — Twyler L Haskins
*Assistant Examiner* — Angel L Garces-Rivera

(57) ABSTRACT

A multiple camera imaging system, comprising a first camera image sensor configured to obtain a first image of a scene from a first vantage perspective point; a second camera image sensor configured to obtain a second image of the scene from a second vantage perspective point; and an image signal processor (ISP), configured to process the first image and the second image by performing the following steps: producing a first monotone image from the first image, and a second monotone image from the second image; projecting the first monotone image to produce a first one-dimensional profile; and projecting the second monotone image to produce a second one-dimensional profile; extracting a matching information from the first and second one-dimensional profiles by matching the second one-dimensional profile to the first one dimensional profile; using the matching information produce a first processed two-dimensional image, and a second processed two-dimensional image that is aligned with the first processed two-dimensional image.

24 Claims, 6 Drawing Sheets

(56) References Cited

OTHER PUBLICATIONS

Hardware Efficient Design of Real Time Profile Shape Matching Stereo Vision Algorithm on FPGA; Hindawi Publishing Corp, International Journal of Reconfigurable Computing, vol. 2014, Article ID 945926, 12 pages, Beau Tippetts, Dah Jye Lee, Kirt Lillywhite and James K. Archibald.

Epipolar Geometry Based on Line Similarity; School of Computer Science and Engineering, The Hebrew University of Jerusalem, Israel, Gil Gen-Artzi, Tavi Halperin, Michael Werman, Shmuel Peleg.

ALIGNMENT OF MULTIPLE CAMERA IMAGES BY MATCHING PROJECTED ONE DIMENSIONAL IMAGE PROFILES

TECHNICAL FIELD

This disclosure relates to image signal processing of a dual or multiple camera imaging system, which includes two or more cameras, with each camera taking its own image of the same scene from its own perspective vantage point. More particularly, this disclosure relates to transforming these camera images, which are two-dimensional, into one-dimensional integral or average profiles, and using a one-dimensional profile matching technique to align the two or more images obtained by the aforementioned two or more cameras.

BACKGROUND INFORMATION

An array camera includes an array of individual cameras, and is alternatively referred to as a multiple camera imaging system. An example of such an imaging system is a dual camera system that is becoming a popular product feature in mobile phones. Typically, the individual cameras cooperate to provide imaging functionality that cannot be achieved by using only one camera by itself. For example, in stereo imaging, two individual cameras each takes an image of the same scene from two slightly different vantage points, thereby producing a depth perception functionality that is not achievable with a single camera alone. As another example, in dynamic zooming, the dual camera system includes a telephoto lens camera with a narrower but more focused field of view (FOV), and a wide FOV camera with a wider but less focused field of view. These two cameras are directed to each take an image of essentially the same scene, with the telephoto lens camera providing a more zoomed-in view of the scene. The pair of images captured by these two cameras may be processed and then combined to provide a range of zoom levels, thereby producing a dynamic zooming functionality. With only a single camera, such functionality would require a complex, active-type mechanical adjustment of a variable imaging objective.

The abovementioned dual camera operations rely on proper combination or superposition of two images captured by two different cameras that are placed at slightly different positions, thus having slightly different perspective views of the same scene. Prior to image combination or superposition, geometrical corrections are applied to the captured images to rectify each image and to align them with each other. Conventionally, the requisite alignment process is based on comparing pixel values between individual images to find corresponding pixels. Imperfections in this image combination approach result in image objects that may appear misplaced. Moreover, the alignment process is applied to two-dimensional images, and incurs a great deal of computational cost in terms of hardware complexity and lengthy image processing time.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
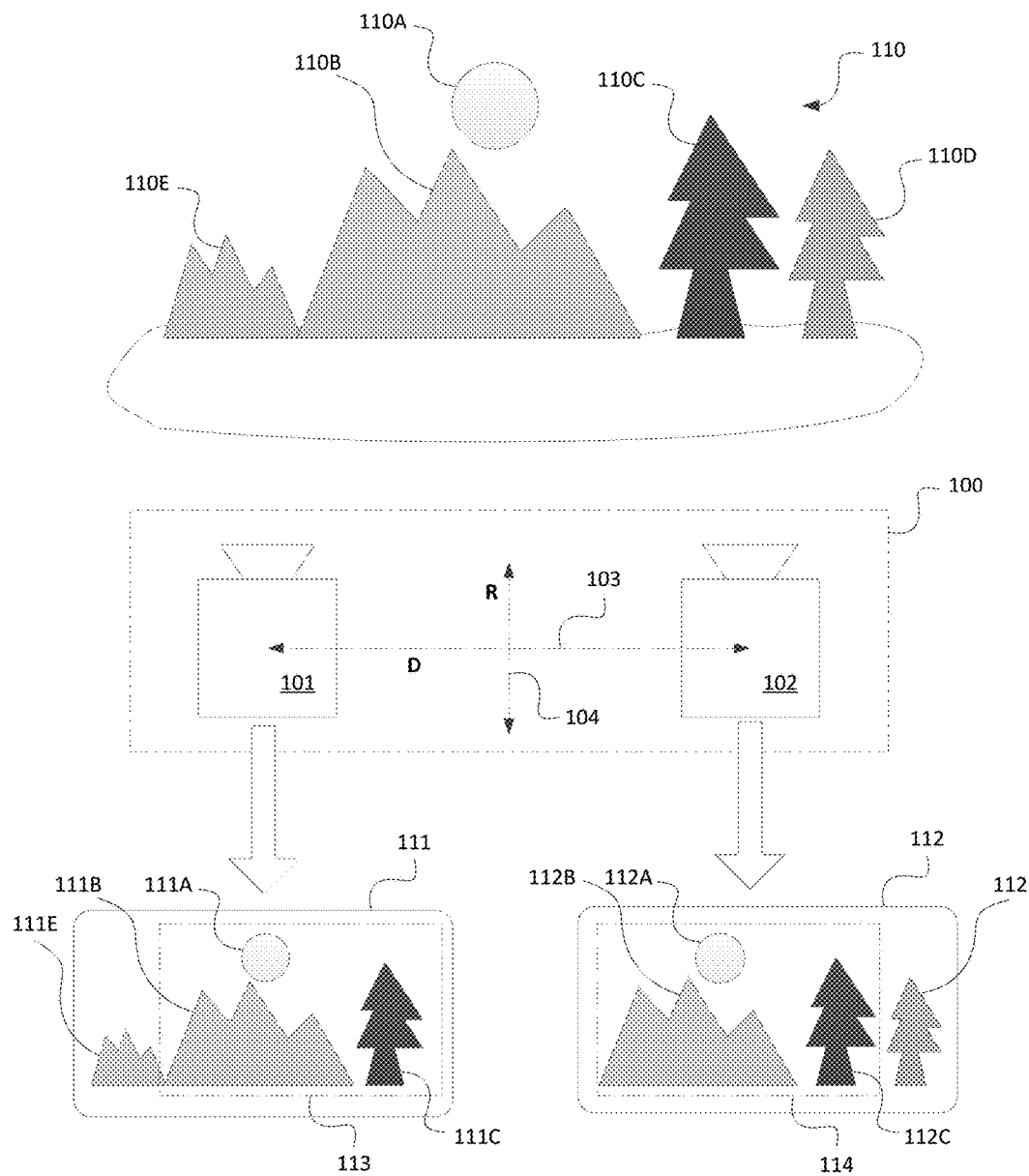
FIG. 1 is a schematic diagram showing a first camera sensor imaging a scene to produce a first image from a first perspective vantage point, and a second camera sensor imaging the same scene to produce a second image from a second perspective vantage point.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "example" or "embodiment" means that a particular feature, structure, or characteristic described in connection with the example is included in at least one example of the present invention. Thus, the appearances of "example" or "embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise.

Multiple Camera Imaging System and Disparity Direction

Figure 6:
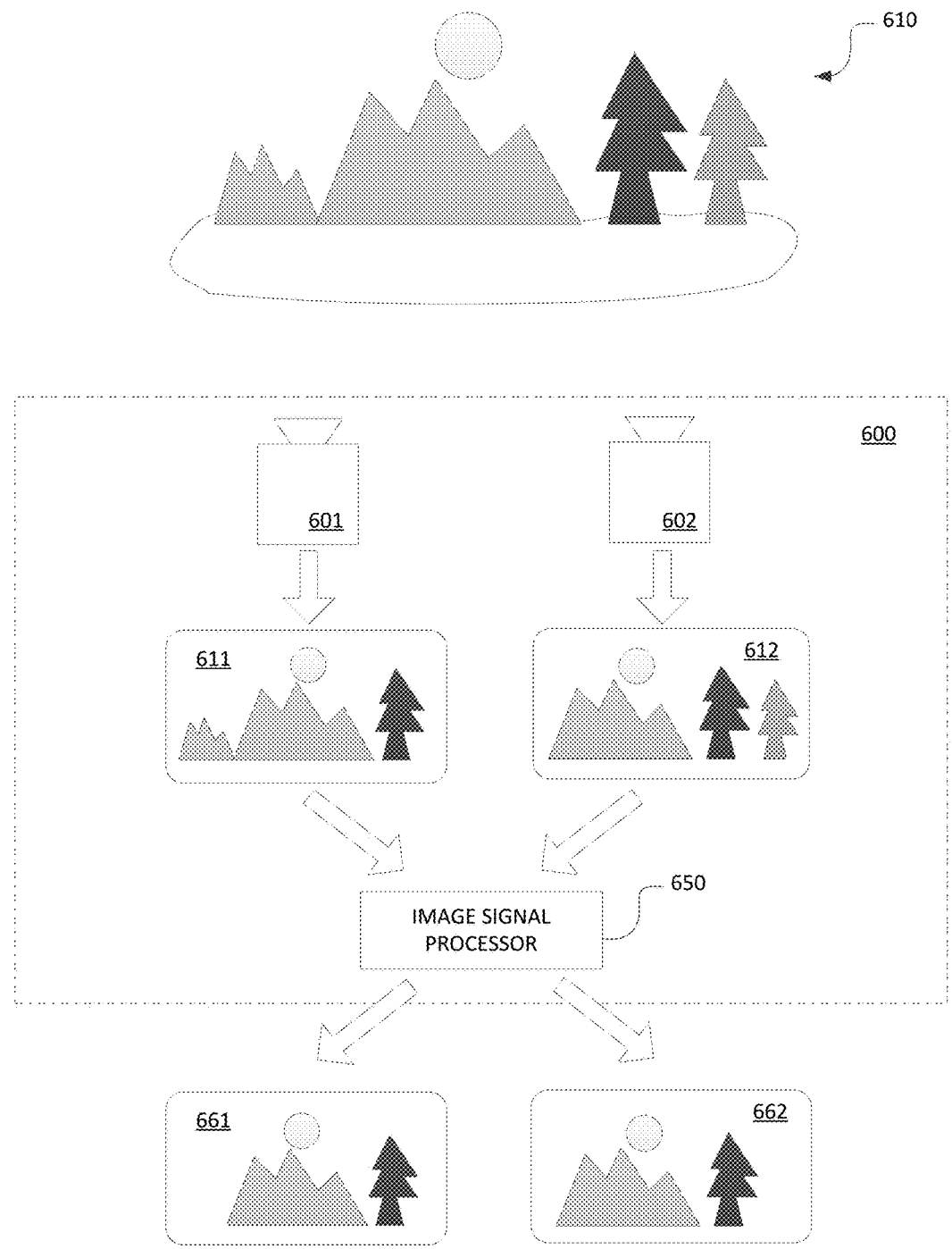
FIG. 6 is a schematic diagram showing a multiple camera imaging system that includes a first camera sensor to image a scene to produce a first image from a first perspective vantage point, a second camera sensor to image the same scene to produce a second image from a second perspective vantage point, and an image signal processor (ISP) to process and align the first and second images.

FIG. 6 is a schematic diagram showing a multiple camera imaging system 600 that includes a first camera (or camera sensor) 601, a second camera (or camera sensor) 602, and an image signal processor (ISP) 650. The imaging system 600 takes images of a scene 610. More specifically, the first camera 601 obtains a first image 611 of the scene 610 from a first vantage point (for example, the left side). The second camera 602 obtains a second image 612 of the same scene 610 from a second vantage point (for example, the right side). It is appreciated that the first image 611 and the second image 612 have different perspectives. Both images are conveyed to the ISP 650 to be processed, the operation of which may include some or all the steps of cropping, monotone conversion, alignment, and other relevant image signal processing techniques. After processing, the imaging system 600 outputs a first processed image 661, and a second processed image 662 that is aligned (but not necessarily matched) with the first processed image 661. These two processed images may then be used for various applications, such as depth perception, dynamic zooming, etc.

FIG. 1 is a diagram that shows more details of the aforementioned multiple camera imaging system, particularly the details relating to the relative spatial relationship of the two cameras therein. As shown in FIG. 1, a multiple camera imaging system 100 includes a first camera (or camera sensor) 101, and a second camera (or camera sensor) 102. It is appreciated that in an embodiment, these two cameras may be of the same type. In another embodiment, the two cameras may be of different types. For example, the first camera 101 may be a telephoto lens camera, whereas the second camera 102 may be a wide FOV camera.

The first camera 101 produces a first image 111 from a scene 100 from a first perspective vantage point (for example, the left side). The second camera 102 produces a second image 112 from the same scene 100 from a second perspective vantage point (for example, the right side). It is appreciated that the first image 111 and the second image 112 have different perspectives. In addition, in a exemplary scenario not shown in FIG. 1, when the first camera 101 is a telephoto lens camera, and the second camera 102 is a wide FOV camera, the second image 112 may contain most or all the objects in the first image 111, plus additional objects not in the first image 111, due to the wide FOV feature of the second camera 102.

As shown in FIG. 1, the first and second cameras 101 and 102 are positioned along a first direction 103 (also marked as direction D), which directly connects the first and second cameras 101 and 102. This first direction 103 is also known as a disparity direction, because it is along this direction 103 that the first and second images 111 and 112 are significantly different in perspective, even though both images are taken of the same scene 110. A basic cause for this disparity is that there is a significant positional difference between the first and second cameras 101 and 102 along this first direction 103.

A second direction 104 (also marked as direction R) is orthogonal to the first direction 103. Along this orthogonal direction 104, there is no significant positional difference between the first and second cameras 101 and 102. Accordingly, between the first and second images 111 and 112, there is no significant disparity in the second direction 104, although error still exists in the orthogonal direction 104.

FIG. 1 shows that the scene 110 includes scene objects 110A, 110B, 110C, 110D, and 110E. Due to the first vantage point of the first camera 101, it takes the first image 111 that includes first image objects 111A, 111B, 111C, and 111E, which correspond to scene objects 110A, 110B, 110C, and 110E. Scene object 110D is not captured in the first image 111. On the other hand, due to the second vantage point of the first camera 102, it takes the second image 112 that includes second image objects 112A, 112B, 112C, and 112D, which correspond to scene objects 110A, 110B, 110C, and 110D. Scene object 110E is not captured in the second image 112. This disparity between the first image 111 and the second image 112 may be rectified in a preliminary image processing step (disclosed later) by cropping the first and second images 111 and 112 to contain essentially the same objects. As shown in FIG. 1, a first cropped image 113, which is cropped from the first image 111, contains essentially the same objects as a second cropped image 114, which is cropped from the second image 112. Cropping helps to render the first and second images 111 and 112 to be more similar to each other than their original raw forms.

In the example above, it is presumed that the first and second cameras 101 and 102 face directly forward toward the scene 110. In a different scenario not shown in FIG. 1, if the first camera 101 on the left side slants to the right side, and if the second camera 102 on the right side slants to the left side, then the scene objects captured by each camera will be different from the example in FIG. 1. A person of ordinary skill in the art will be able to understand this different scenario, hence further details of this scenario is not disclosed herein.

In addition, there is parallax between the first and second images 111 and 112. This is because the first and second cameras are located in different positions along the first direction 103. Parallax may be useful in certain types of image processing, for example, to estimate the depths of objects in a scene. Parallax is another type of disparity that is caused by the different vantage points and angles of the first and second cameras 101 and 102.

Preliminary Image Processing

After the first and second images 111 and 112 have been obtained by the first and second cameras 101 and 102, the two images may go through a preliminary processing step, which is based on a pre-shipping (or off-line) calibration process. More specifically, since the positions and the functionalities of the first and second cameras 101 and 102 are known, a pre-shipping (or off-line) calibration process may be engaged to utilize a calibration chart to obtain intrinsic and extrinsic matrices and distortion coefficients of the two cameras. This will help to rectify the first and second images 111 and 112 in aspects such as having the same field of view, and also to roughly align them, both in the first direction 103 and in the second direction 104. However, even under the best circumstances, there will be post-shipping (or on-line) residual errors that occur when the first and second cameras 101 and 102 capture images in real life. One aspect of the exemplary causes of these residual errors may be due to open loop voice coil motor (VCM) inaccuracy (with regard to lens focusing), relative movement between the two cameras due to vibration, alterations to the camera performance due to usage, etc. These causes pertain to the residual errors in both the first and second directions 103 and 104. Another aspect of the residual errors may be attributed to a practically unavoidable camera misalignment along the first direction 103 when the first and second cameras 101 and 102 are physically installed (before shipping). This camera misalignment cannot be completely eliminated by the off-line (pre-shipping) calibration, and is a significant cause for an image misalignment along the second direction 104 between the first and second images 111 and 112. Further on-line calibration to improve image alignment (after the preliminary, off-line image processing step) is needed.

It is appreciated that, throughout this disclosure, the techniques to process the first and second images 111 and 112 in order to align them relate primarily to the correction of the image residual errors in the second direction 104 only. Residual errors in the first direction 103 are not substantially dealt with in this disclosure.

The preliminary image processing step includes several sub-steps. First, one or both of the images are cropped and/or zoomed based on pre-shipping (off-line) camera calibration data, so that they contain essentially the same objects. As an example, in FIG. 1, the first image 111 is cropped to produce the first cropped image 113 that includes the first image objects 111A, 111B, and 111C, which correspond to the scene objects 110A, 110B, and 110C, respectively. The second image 112 is cropped to produce the second cropped image 114 that includes the second image objects 112A, 112B, and 112C, which correspond to the scene objects 110A, 110B, and 110C, respectively. The first and second cropped images 113 and 114 therefore contain essentially the same objects. In the case (not shown in FIG. 1) where the first camera 101 is a telephoto lens camera (with a narrower viewing range), and the second camera 102 is a wide FOV camera (with a wider viewing range), the second image 112 (a wide FOV image containing more objects) is cropped so that it includes substantially the same objects as the first image 111 (a close-up telephoto image containing fewer objects). In a preferred embodiment, the first and second cropped images 113 and 114 are rendered to have essentially the same objects in the disparity direction 103. This embodiment helps to make a subsequent one-dimensional projection step in the disparity direction 103 to be more accurate and consistent. In contrast, there is more leeway in terms of image cropping in the orthogonal direction 104.

A zooming operation may also be applicable in conjunction with cropping, in order to render the two images 113 and 114 to have essentially the same objects, particularly in the disparity direction 103. The zooming operation is appropriate in an exemplary situation where one camera is a telephoto lens camera, and the other camera is a wide FOV camera.

In the description above, it is presumed that the first and second cameras 101 and 102 face directly forward toward the scene 110. In a different scenario, if the first camera 101 on the left side slants to the right side, and if the second camera 102 on the right side slants to the left side, then the scene objects captured by each camera will be different from the example above. A person of ordinary skill in the art will be able to understand this different scenario. It is appreciated that the cropping operation of this scenario follows the same goal that both cropped images will contain substantially the same objects, particularly in the disparity direction.

In a second sub-step of preliminary image processing, the first and second images 111 and 112, in case they are color images, are converted into monotone images. A color image may have several color channels, for example, red, green and blue channels. Converting a color image into a monotone image may be done in several ways. A first type of monotone image may be produced by taking the value of only one color channel, for example, the green channel (in part because human eye is most sensitive to green color). A second type of monotone image may also be produced by weighted averaging or summing the values of two or more color channels, for example, by weightedly averaging or summing the red, green, and blue channels (i.e., the red, green, blue channel may each have its own predetermined weight when they are being averaged or summed). This second type of monotone image is also known as a gray scale image, because it is essentially a black and white image with different shades of gray.

Figure 2:
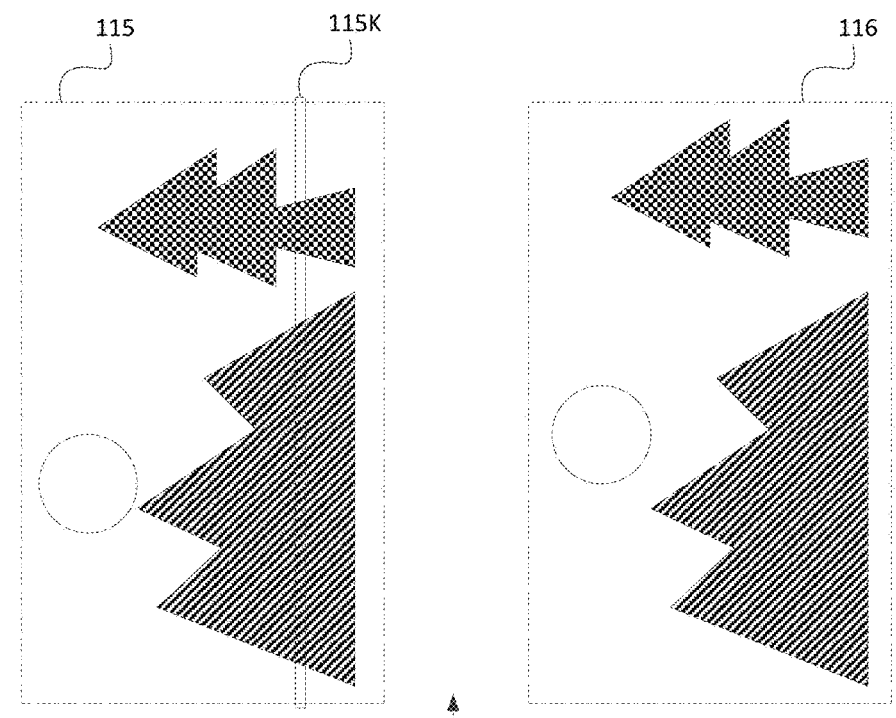
FIG. 2 is a diagram showing the projection of a first monotone image and a second monotone image in a disparity direction to produce a first one-dimensional profile and a second one-dimensional profile along a direction that is orthogonal to the disparity direction.
Figure 2:
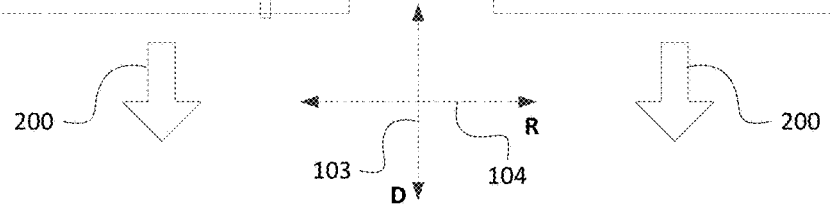
Figure 2:
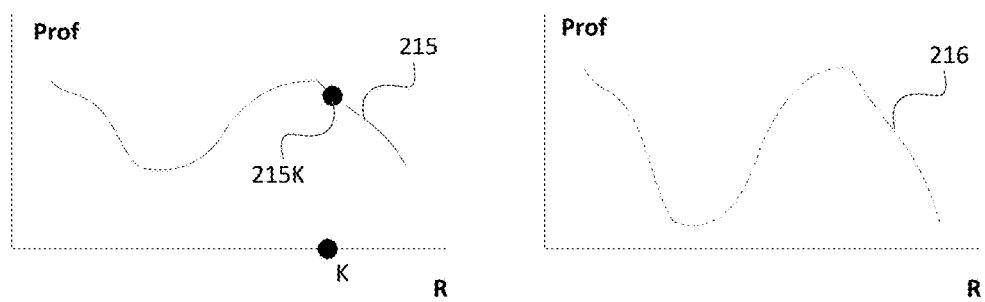

As a result of performing the preliminary processing step, the first and second images 111 and 112 are converted into a first monotone image 115 and a second monotone image 116, which are shown in FIG. 2. Both the first and second monotone images 115 and 116 have essentially the same objects due to cropping, particularly in the disparity direction 103. For demonstration purpose only, both monotone images are rotated 90 degrees for the subsequent projection step into one-dimensional profiles, and are roughly aligned. Preliminary processing helps to ensure that the first and second images 111 and 112 are converted into a form that is more suitable for the subsequent one-dimensional projection step.

It is appreciated that the rotation of the monotone images to 90 degrees is for demonstration purpose (i.e., ease of understanding) only, such that after a subsequent one-dimension projection (disclosed below), the resulting one-dimension profiles agree with the convention that the horizontal direction represents the independent variable, and the vertical direction represents the dependent variable. In reality, the 90 degree rotation is not necessary for the presently disclosed image processing.

One-Dimensional Projection of Two-Dimensional Images

Generally speaking, aligning two images involves matching specific feature points between the two images. Since the images are two dimensional, their alignment process is a two-dimensional operation, and incurs a great deal of computational cost in terms of hardware complexity and lengthy image processing time. As an improvement, the current disclosure projects two-dimensional images to create one-dimensional profiles, and then aligns these profiles. This is a much less complex and much faster process than the conventional two-dimensional operations.

As shown in FIG. 2, the first monotone image 115 is subjected to a projection process 200 to produce a first one-dimensional profile 215. The second monotone image 116 is also subjected to the same projection process 200 to produce a second one-dimensional profile 216. Several notable aspects of the projection process 200 are disclosed herein.

In a first aspect, the projection process is in the first direction 103, which is also the disparity direction, as is first introduced in FIG. 1. The disparity direction 103 is defined as the direction of a line connecting the first and second cameras 101 and 102, as shown in FIG. 1. If the two cameras are lined up horizontally, as is the case in FIG. 1, the disparity direction 103 is the same horizontal direction. In FIG. 2, the first and second monotone images 115 and 116 have been rotated 90 degrees for demonstration purpose only, so the disparity direction 103 is now in a vertical direction.

A second direction that is orthogonal to the disparity direction 103 is the orthogonal direction 104. In FIG. 2, the orthogonal direction 104 is horizontal, because the disparity direction 103 is vertical. As shown in FIG. 2, the first and second one-dimensional profiles 215 and 216 are laid out along the second, orthogonal direction 104. As previously explained, the two monotone images 115 and 116 have an image disparity (such as parallax) primarily in the disparity direction 103, due to the relative positioning of the cameras 101 and 102. Therefore, projecting the two monotone images 115 and 116 in the disparity direction 103 will help to marginalize (for example, to minimize) the disparity information between these two images in their respective one-dimensional profiles 215 and 216 (which spread out along the orthogonal direction 104). It is a more preferred approach than a projection in the orthogonal direction 104, because it increases the accuracy of a subsequent local matching step (to be disclosed later). In fact, projection in the orthogonal direction 104 will produce one-dimensional profiles that are practically unmatchable. At any rate, throughout this disclosure, the image processing techniques that include projection and local matching strive to primarily correct for the residual errors in the second direction 104, so the aforementioned one-dimensional projection should be in the first direction 103.

Further, it is particularly appreciated that the first and second monotone images 115 and 116 have essentially the same objects due to cropping. Projecting the two images 115 and 116 that have been cropped in such a way helps to render the projection to be more consistent between the two one-dimensional profiles 215 and 216.

In a second aspect, the projection process 200 is exemplified by an integration of pixel values along the disparity direction 103. More specifically, a column 115K of the rotated monotone image 115 includes a multitude of pixels. Integrating these pixels by adding up the values of the pixels results in a singular, one-dimensional profile value, which is represented by a profile point 215K in the first one-dimensional profile 215, as shown in FIG. 2. Alternatively, the projection may be accomplished by averaging the pixel values instead of adding them. In FIG. 2, K is the positional index of the profile point 215K. Although the first and second one-dimensional profiles 215 and 216 are depicted as continuous curves for the ease of representation, in reality, they are made up of discrete points (through which a continuous curve may be fitted).

Typically, for gray scale images, each pixel value ranges from 0 to 255, and each pixel column (such as column 115K) may contain several hundred to several thousands of pixels. Therefore, the first and second one-dimensional profiles may have profile values that range from zero to several million.

Optional Normalization of One-Dimensional Profiles

It is appreciated that the first and second cameras 101 and 102 may be different types of cameras, each having its own set of exposure level and field of view. For example, the first camera 101 may be a telephoto lens camera, and the second camera 102 may be a wide FOV camera. Accordingly, the first and second images 111 and 112 that these cameras capture may be different from each other in several aspects, such as brightness, dynamic range, etc. After these different images are processed and projected to create the first and second one-dimensional profiles 215 and 216, their profile value ranges will likely be different. For example, the first one-dimensional profile 215 may have a profile value range between 10 and $10^5$, whereas the second one-dimensional profile 216 may have a profile value range between 0 and $10^7$. Before these two profiles 215 and 216 are to be aligned, they may need to be normalized This is further explained below.

Figure 3:
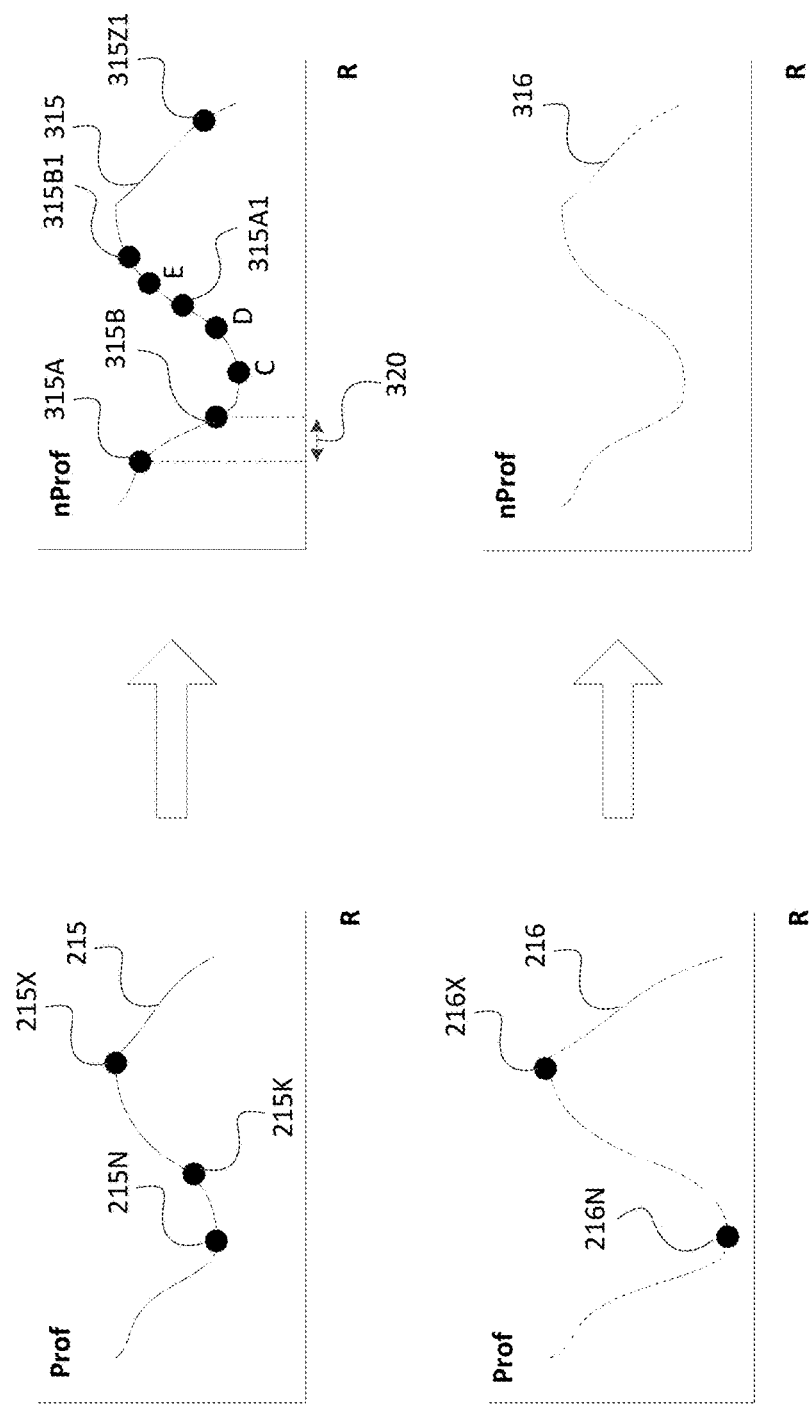
FIG. 3 is a diagram showing the normalization of the first and second one-dimensional profiles to produce a first normalized one-dimensional profile and a second normalized one-dimensional profile.

FIG. 3 illustrates a process wherein the first one dimensional profile 215 is normalized to produce a first normalized one-dimensional profile 315, and wherein the second dimensional profile 216 is normalized to produce a second normalized one-dimensional profile 316. More specifically for the first one-dimensional profile 215, this normalization process involves identifying a first one-dimensional profile maximum point 215X that has a maximum profile value of $V_{max}$, and a first one-dimensional profile minimum point 215N that has a minimum profile value of $V_{min}$, and then applying the following exemplary equation to normalize the whole first one-dimensional profile 215.

$$nProf(k) = \frac{Prof(k) - V_{min}}{V_{max} - V_{min}}$$

Here, k is the position index of any profile point 215K, Prof(k) stands for the original, pre-normalization profile value at that profile point 215K, and nProf(k) stands for the normalized profile value of the profile point 215K. In this manner, the whole first one-dimensional profile 215 is normalized to become the first normalized one-dimensional profile 315, which now has a profile value range that is between zero and one.

The second one-dimensional profile 216 is normalized in the same manner, through the use of a second one-dimensional profile maximum point 216X (with a maximum profile value of $V_{max}$) and a second one-dimensional profile minimum point 216N (with a minimum profile value of $V_{min}$), to create the second normalized one-dimensional profile 316, which also has a profile value range that is between zero and one. Therefore, the first and second normalized one-dimensional profiles 315 and 316 are forced to have the same profile value range, which is helpful to the subsequent alignment process through local matching.

After normalization, the first and second normalized one-dimensional profiles 315 and 316 are processed to extract a set of matching information that is then used to produce two aligned two-dimensional images as a result. The overall goal is to use the first normalized one-dimensional profile 315 as a template, query set, and to process the second normalized one-dimensional profile 316 as a candidate set to match the query set. This information extraction process involves several subparts: forming a query set descriptor, forming a candidate set descriptor group, and local matching. Each subpart is further disclosed herein.

It is appreciated that the aforementioned normalization process is optional, for the following reasons. First, the first and second one-dimensional profiles 215 and 216 may not need normalization in the first place, when images have similar brightness and dynamic range. Second, even when the brightness and dynamic range difference is significant, normalization may still not be needed if a local matching step (disclosed below) uses a cross correlation technique, instead of the more conventionally used L1norm or L2 norm technique.

Sampling to Form Query Set Descriptors

Extracting matching information from the first and second normalized one-dimensional profiles 315 and 316 is done in a piecemeal fashion, instead of in a point-by-point fashion. Matching two profiles point by point is not generally accurate, because there are many points between the two profiles that have the same value. Therefore, the matching operation is performed by trying to match a profile segment (from a group of segments in a candidate set) to another profile segment (from a query set). Compared with a point, a segment is more unique, and offers a more truthful degree of matching. Without losing generality, the first normalized one-dimensional profile 315 is sampled to create a query set consisting of descriptor segments; the second normalized one-dimensional profile 316 is processed to create a candidate set consisting of groups of descriptor segments.

FIG. 3 shows a method to sample the first normalized one-dimensional profile 315 to create a query set of descriptors. A descriptor is defined as a profile segment that is used in matching, and includes several properties, which are illustrated herein by referring to the profile 315. First, a descriptor is a segment of data points, i.e., a collection of sequential data points (for example, all the data points between, and including, a start point 315A and an end point 315A1 in FIG. 3). Second, a descriptor has its own value, with is the collection of profile values of all the data points that make up the descriptor. Therefore, a descriptor value is a group of numbers. For example, the collection of each profile value of each data point from the start point 315A to the end point 315A1 form the descriptor value of that descriptor. Third, a descriptor has a starting position, for example, the position of the start point 315A. Lastly, a descriptor has a length, for example, the horizontal distance between the start point 315A and the end point 315A1, inclusive. It is appreciated that the descriptor length may vary, depending on the profile statistics (for example, profile value variance) of that descriptor. Larger variance generally means larger descriptor length; smaller variance generally means shorter descriptor length. Within the same profile 315, the several descriptors that are sampled from it may each have its own unique length. On the other hand, to simplify computation, all descriptor lengths may be predetermined to be the same regardless of profile statistics.

As shown in FIG. 3, the first normalized one-dimensional profile is sampled at a first sampling point 315A to generate a first query set descriptor, which starts at point 315A and ends at point 315A1. The horizontal distance (unit: number of points) between points 315A and 315A1, inclusive, is the descriptor length L. After a fixed sampling interval, for example, 16 points, the first normalized one-dimensional profile 315 is sampled again at a second sampling point 315B to generate a second query set descriptor, which starts at point 315B and ends at point 315B1. The horizontal distance between points 315B and 315B1 may or may not have the same descriptor length L. This sampling process continues at points C, D, E, etc. Point 315Z1 is the end point of the last query set descriptor. It is appreciated that the multitude of query set descriptors generated as such may each have its own unique length based on profile statistics, or they may all have the same fixed descriptor length L to simplify computation.

Figure 4:
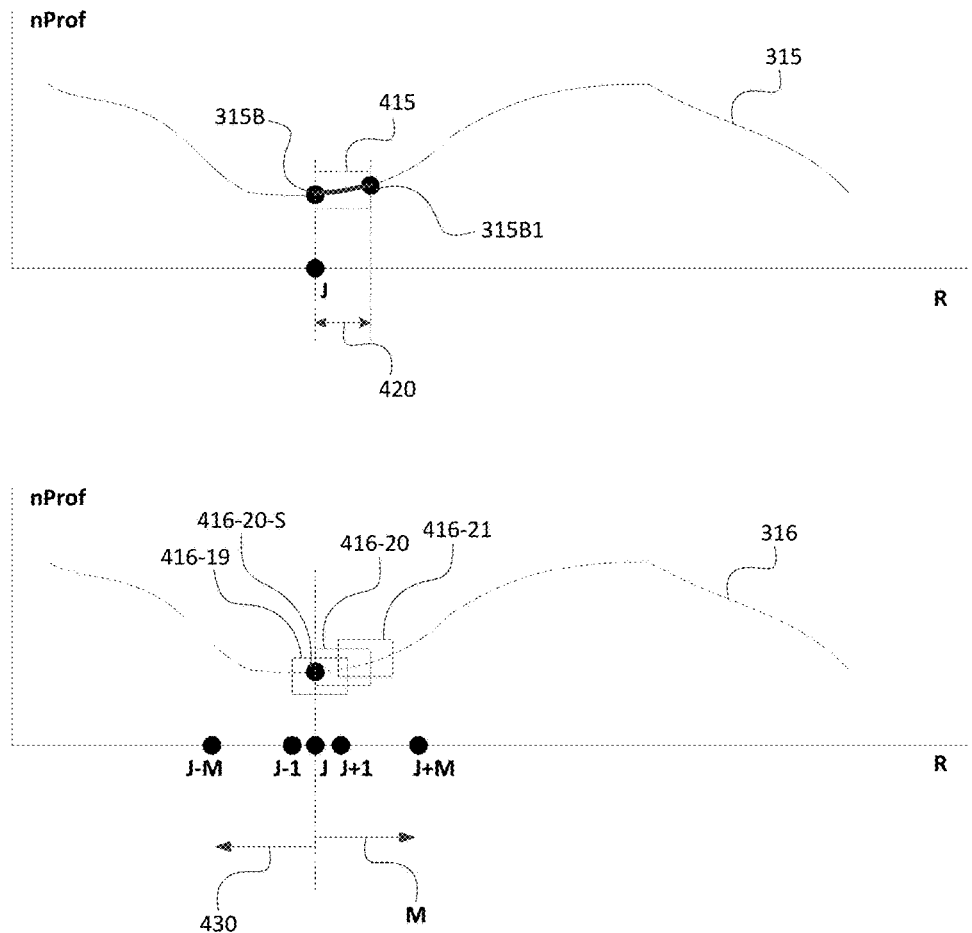
FIG. 4 is a diagram showing the local matching of a group of candidate set descriptors to a single query set descriptor, in order to identify the best-matched candidate set descriptor.

To further illustrate the quantitative representation of query set descriptors, FIG. 4 shows an exemplary query set descriptor 415, which is a segment of the first normalized one-dimensional profile 315. The query set descriptor 415 starts at the start sampling point 315B, and ends at the end sampling point 315B1. The descriptor 415 has a length L (10 to $10^3$ points long), which is represented by a double arrowed line segment 420 in FIG. 4. The descriptor length L may be based on the profile statistics of the descriptor 415, or it may be a predetermined fixed value to simplify computation. The query set descriptor 415 has a start position index of J (corresponding to the start sampling point 315B), which entails that the descriptor end position index must be J+L−1. Within the descriptor 415, each component point may be generally represented its position index J, J+1, . . . , up to J+L−1.

It is appreciated that the vertical scale of the first and second normalized one-dimensional profiles 315 and 316 are between zero and one, as depicted in FIG. 4 by the "nProf" designation, which stands for "normalized profile". The horizontal axis label R stands for orthogonal direction (direction 104 in FIG. 2), which is orthogonal to the disparity direction D (direction 103 in FIG. 2).

Regions near the two ends of the first normalized one-dimensional profile 315 are not sampled in order to account for edge effects. As the disclosure below illustrates, candidate set descriptors will be subsequently formed in positions to both the left and right sides of each query set descriptor. Not sampling the first normalized one-dimensional profile 315 near its left and right end regions will leave room for the proper execution of the subsequent candidate set descriptor group formation.

Forming Candidate Set Descriptor Groups

For each query set descriptor as disclosed above, a corresponding group of candidate set (also known as training set) descriptors need to be generated from the second normalized one-dimensional profile 316. Each candidate set descriptor within this corresponding group has its start point, end point, and descriptor length. These quantities are further explained herein.

FIG. 4 illustrates how, for any specific query set descriptor 415 (which is a part of the first normalized profile 315), a corresponding group of candidate set descriptors may be formed. For example, from the second normalized one-dimensional profile 316, a corresponding central candidate set descriptor 416-20 may be identified. This central candidate set descriptor 416-20 has a start point 416-20-S as shown, with a start position index of J, which is the same value as the start position index of the corresponding query set descriptor 415. The central candidate set descriptor 416-20 has the same descriptor length L as the query set descriptor 415.

In addition to the central candidate set descriptor 416-20, other candidate set descriptors are also generated. As an example, a plus-one adjacent candidate set descriptor 416-v may be generated by designating its start position index to be J+1, and its length being the same L as the central descriptor 416-20. A minus-one adjacent candidate set descriptor 416-19 may be generated by designating its start position index to be J−1, and its length being the same L as the central descriptor 416-20. Other candidate set descriptors may be similarly generated, by designating their start positions within a range, from J−M to J+M, wherein M is a range radius as represented by an arrowed line segment 430 as shown in FIG. 4. An exemplary range radius M is 20, thereby generating a range from J−20 to J+20. More particularly, there are 41 (in general, 2M+1) candidate set descriptors within a cohort group, each with a start position of J−20, J−19, . . . , J−1, J, J+1, J+19, and J+20 (altogether 41 start positions). All candidate set descriptors have the same length L as their corresponding query set descriptor.

Local Matching of Candidate Set Descriptors to Query Set Descriptors

After generating a cohort group of candidate set descriptors 416-20, 415-19, 416-20, etc., each candidate set descriptor is compared with the query set descriptor 415, so as to identify the candidate set descriptor that is closest, or otherwise best-matched, to the query set descriptor 415. This is a local matching process, which is further described below.

Each of the 2M+1 number of candidate set descriptor may be uniquely identified by its start position index T, wherein T is J−M, J−(M−1), . . . , J−1, J, J+1, J+(M−1), and J+M. Their corresponding query set descriptor may be uniquely identified by its start position index J The comparison between each candidate set descriptor T and the query set descriptor J may be accomplished by calculating the distance between them, as shown in an equation that is based on an L1 norm method. An alternative L2 norm method is also applicable, as one of ordinary skill in the art may recognize, but is not disclosed in further details herein. Another alternative cross correlation method is also similarly applicable, but is not disclosed in further details herein.

It is appreciated that with the cross correlation method, the one-dimensional profiles 215 and 216 do not need to be normalized in the first place.

The local matching equation based on L1 norm is:

$$d(J, T) = \sum_{p=1}^{p=L} \text{abs}[nProf(J, p) - nProf(T, p)]$$

Here, d(J,T) stands for the distance between the candidate set descriptor T and the corresponding query set descriptor J; p stands for position indexes within a descriptor; L stands for descriptor length. If L is 100 points, then p is 1, 2, . . . , up to 100. The ordered pair (J,p) stands for each position index of the query set descriptor J. The ordered pair (T,p) stands for each position index of the corresponding candidate set descriptor T.

An absolute value difference of the normalized profiles (i.e., nProf) between the query set descriptor J and the corresponding candidate set descriptor T is calculated at each position index p, throughout the entire descriptor length L, and then totaled. This yields the distance d(J,T). The calculation of d(J,T) is performed for each descriptor within the candidate set group of descriptors, i.e., for T=J−M, J−(M−1), . . . , J−1, J, J+1, J+(M−1), and J+M. The candidate set descriptor that has the smallest distance is deemed to be the closest matched candidate set descriptor. In case there is a tie, then the candidate set descriptor whose start position index T is closer to the query set descriptor start position index J will be chosen as the winner. The end result is that among the cohort group of candidate set descriptors, only one descriptor is identified as being the closest to the corresponding query set descriptor. This is the matching information that is extracted by the aforementioned local matching process.

A selected portion of an exemplary matching information may look like the representation of the following table (L represents descriptor length, which is either a variable based on profile statistics, or a constant based on a predetermined fixed value):

TABLE 1

Examples of query set descriptors and best-matched candidate set descriptors

| Query set descriptor start position | Query set descriptor end position | Candidate set best-matched descriptor start position | Candidate set best-matched descriptor end position |
|---|---|---|---|
| 100 | 100 + L-1 | 98 | 98 + L-1 |
| 116 | 116 + L-1 | 117 | 117 + L-1 |
| 132 | 132 + L-1 | 129 | 129 + L-1 |

In this table, three query set descriptors are given as an illustrative example. Descriptor sampling interval is every 16 points, so the query set descriptor start position increments by 16. In this example, these are 100, 116, 132, etc. Candidate set descriptor group range radius may be 20. Therefore, each candidate set descriptor start position may be within 100±20, 116±20, 132±20, etc. Within each candidate set descriptor group, the best-matched candidate set descriptor is identified by the aforementioned local matching algorithm. In this example, their start positions are 98 (within 100±20), 117 (within 116±20), 129 (within 132±20), etc. Since the descriptor length is represented by L (which may be either a variable or a constant), the end position of any query or candidate set descriptor is always the start position plus (L−1).

Modeling and Rectification Operations

It is reasonably assumed that the transformation along one direction (horizontal/vertical) is the same as another direction (vertical/horizontal). Therefore, the aforementioned matching information extracted from one direction (the orthogonal direction R) is used to construct a suitable model in order to restore two-dimensional images from one-dimensional profiles. As an example, an affine model with scaling parameter and shift parameter may be used in the modeling. In addition, based on an online calibration model, linear interpolation may be used to rectify the one or both of the restored two-dimensional images. The end result is to produce the first and second processed two-dimensional images 661 and 662, as previously shown in FIG. 6. These images are now aligned with each other, and are suitable for further information extraction and/or image processing, such as depth perception, dynamic zooming, etc.

Exemplary Image Signal Processing Operation Flow

An exemplary image signal processing operation flow is disclosed herein to restate some aspects of the image processing embodiments as described above. This is shown in FIG. 5, wherein each rectangular block stands for a processing block, and each rounded rectangle stands for a data form, such as a two-dimensional image or a projected one-dimensional profile or profile segment (descriptor).

Figure 5:
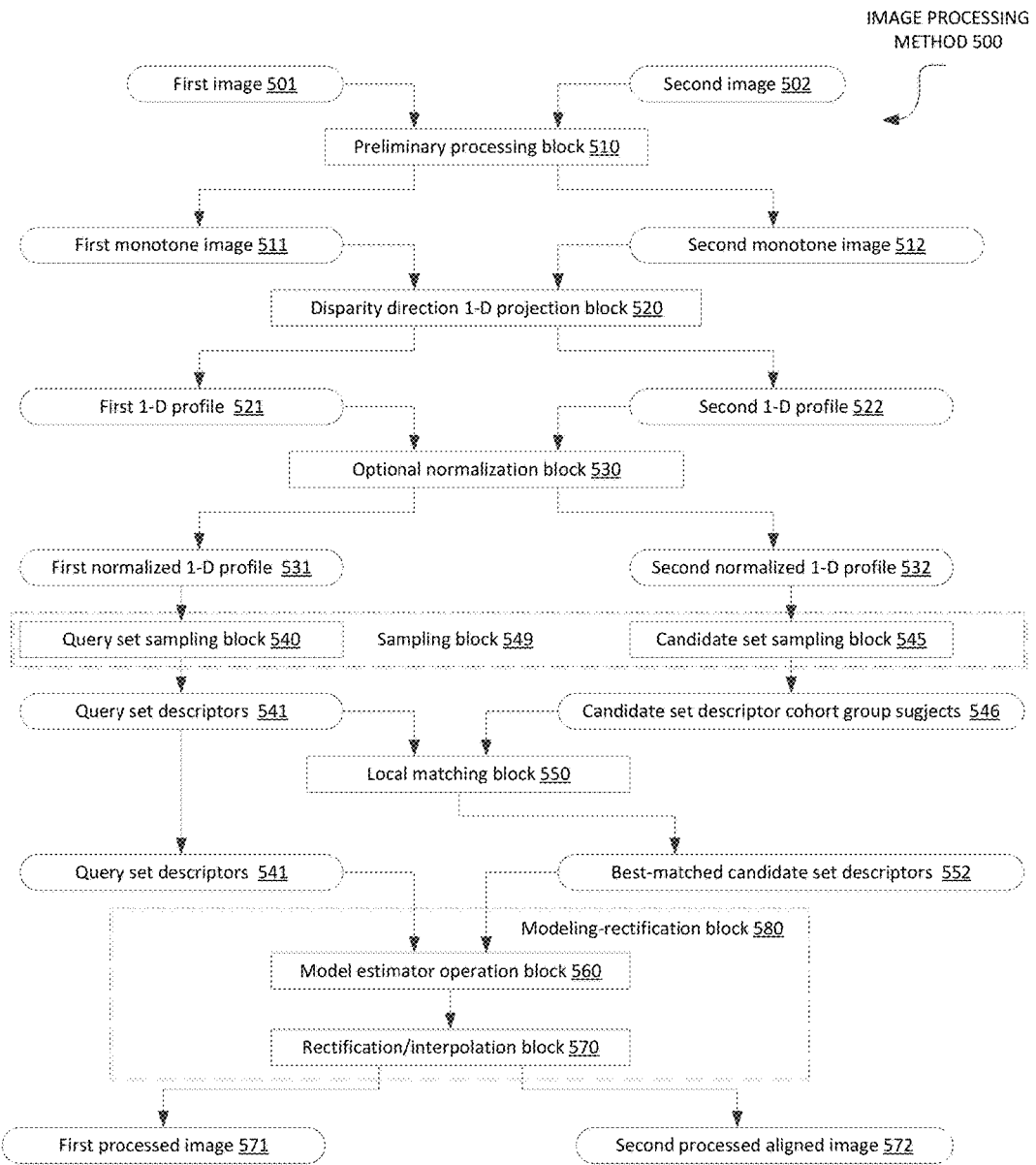
FIG. 5 is a flow chart showing a multitude of digital image signal processing blocks and their operations within an image signal processor (ISP) of a multiple camera imaging system.

As shown in FIG. 5, an image processing method 500 starts with using a first and second image sensor cameras to obtain, from different perspective vantage points, a first image 501 and a second image 502, and sending both images to a preliminary processing block 510. The preliminary processing block 510 performs steps such as cropping-zooming and/or conversion from color to monotone, as needed, and produces a first monotone image 511 and a second monotone 512. These two monotone images are then sent to a disparity direction one-dimensional projection block 520, which projects each monotone image in an image disparity direction (defined as the direction of the line connecting the two image sensor cameras), in order to produce a first one-dimensional profile 521 and a second one-dimensional profile 522. Each profile is laid out along a direction that is orthogonal to the image disparity direction.

Next, an optional normalization block 530 normalizes the first and second one-dimensional profiles 521 and 522 to produce a first normalized profile 531 and a second normalized profile 532, in order to account for issues such as differences in image brightness and dynamic range. These normalized profiles are then sent to a sampling block 549 to be further processed.

The sampling block 549 performs two chief tasks by engaging a query set sampling sub-block 540 and a candidate set sampling sub-block 545. First, the query set sampling sub-block 540 samples the first normalized profile 531 at fixed intervals to produce a number of query set descriptor 541. Second, corresponding to each individual query set descriptor 541, the candidate set sampling sub-block 545 samples the second normalized profile 541 to produce a cohort group of candidate set descriptor subjects 546. These descriptor and descriptor group subjects are then sent to a local matching block 550.

The local matching block 550 uses a comparative algorithm to compare each descriptor within a cohort group of candidate set descriptors 546 with the singular corresponding query set descriptor 541, and identifies a best-matched candidate set descriptor 552. Each query set descriptor 541 and its corresponding, best-matched candidate set descriptor 552 constitute a piece of matching information. This information is aggregated and sent to a modeling-rectification block 580, which includes a model estimator operation sub-block 560 and a rectification/interpolation sub-block 570. As an example, the model estimator operation sub-block 560 may apply an affine model with scaling parameter and shift parameter to restore two-dimensional images from one-dimensional profile information. The rectification/interpolation sub-block 570 may use interpolation to refine any of the two-dimensional images, for example, a second image that is to be aligned with a first image. The end result is a first processed image 571, and a second processed image 572 that is aligned with the first processed image 571. The two images may then be used for further information extraction and/or image processing, such as depth perception, dynamic zooming, etc.

It is appreciated that the cropping-zooming operation in the preliminary processing block 510 may be optional. If the first and second images 501 and 502 are similar in range of objects and scale, the need for cropping-zooming may be reduced. Even if the two images are very different, for example, wide FOV vis-à-vis telephoto lens images, it may still be possible to obviate the need for cropping-zooming. In such a case, the local matching block 550 may utilize pre-sale or off-line camera position information to obtain initial local matching start positions of the query set and candidate set descriptors.

Compared with the conventional image processing that aligns two two-dimensional images based on matching specific key feature points within each image, the aforementioned approach of utilizing one-dimensional profile projection is much less costly, in terms of hardware complexity and processing speed. Experiments have shown that whereas the conventional key feature point detection and matching method (a two-dimensional approach) requires more than 140 milliseconds to obtain the appropriate affine model (before the final two-dimensional image alignment), the currently disclosed one-dimensional profile based method only requires four milliseconds. Hardware complexity in terms of buffer size is also reduced by several orders of magnitude.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A multiple camera imaging system, comprising:
    a first camera image sensor configured to obtain a first image of a scene from a first vantage perspective point;
    a second camera image sensor configured to obtain a second image of the scene from a second vantage perspective point; and
    an image signal processor (ISP), configured to process the first image and the second image by performing the following steps:
    (a) producing a first monotone image from the first image, and a second monotone image from the second image;
    (b) projecting the first monotone image to produce a first one-dimensional profile; and projecting the second monotone image to produce a second one-dimensional profile;
    (c) extracting a matching information from the first and second one-dimensional profiles by matching the second one-dimensional profile to the first one dimensional profile;
    (d) using the matching information produce a first processed two-dimensional image, and a second processed two-dimensional image that is aligned with the first processed two-dimensional image.

2. The multiple camera imaging system of claim 1, wherein the second camera sensor is configured to obtain the second image that has a wider viewing range than the first image obtained by the first camera sensor.

3. The multiple camera imaging system of claim 1, wherein the first and second images are color images that include a multitude of color channels, and wherein step (a) further includes the ISP averaging the multitude of color channels of the first and second images to produce the first and second monotone images.

4. The multiple camera imaging system of claim 3, wherein step (a) further includes the ISP using cropping to produce the first and second monotone images wherein the second monotone image has substantially the same objects as the first monotone image.

5. The multiple camera imaging system of claim 1, wherein the first camera sensor and the second camera sensor are positioned along a first direction; and wherein step (b) further include the ISP projecting the first and second monotone images in the first direction to produce the first and second one-dimensional profiles, wherein the first and second one-dimensional profiles are laid out along a second direction that is orthogonal to the first direction.

6. The multiple camera imaging system of claim 5, wherein step (b) further includes the ISP integrating the first monotone image in the first direction to produce the first one-dimensional profile, and integrating the second monotone image in the first direction to produce the second one-dimensional profile.

7. The multiple camera imaging system of claim 1, wherein step (c) further includes the following steps:
    (i) sampling the first one-dimensional profile to produce a multitude of query set descriptors;
    (ii) for each query set descriptor, processing the second one-dimensional profile to obtain a group of candidate set descriptors; subsequently using a local matching method to identify a best-matched candidate set descriptor that is closest in value to the query set descriptor;
    (iii) repeating step (ii) to form a multitude of best-matched candidate set descriptors corresponding to the multitude of query set descriptors;
    wherein the matching information includes a start and end position information set of the multitude of query set descriptors and the multitude of the best-matched candidate set descriptors.

8. The multiple camera imaging system of claim 7, wherein step (i) further includes the ISP sampling the first one-dimensional profile at a first sampling interval to produce the multitude of query set descriptors, wherein each query set descriptor has a profile length that depends on profile statistics.

9. The multiple camera imaging system of claim 8, wherein step (ii) further includes the ISP processing the second one-dimensional profile to obtain the group of candidate set descriptors, wherein each candidate set descriptor has the same profile length as each query set descriptor, and wherein each candidate set descriptor is situated within a local matching range.

10. The multiple camera imaging system of claim 1, further including between steps (b) and (c) a step of converting the first one-dimensional profile to a first normalized one-dimensional profile; converting the second one-dimensional profile to a second normalized one-dimensional profile; and wherein step (c) extracts the matching information from the first and second normalized one-dimensional profiles by matching the second normalized one-dimensional profile to the first normalized one dimensional profile.

11. A method of digital image signal processing, comprising:
(a) providing a multiple camera imaging system including a first camera sensor, a second camera sensor, and an image signal processor (ISP);
(b) using the first camera sensor to obtain a first image of a scene from a first vantage perspective point; using the second camera sensor to obtain a second image of the scene from a second vantage perspective point;
(c) using the ISP to produce a first monotone image from the first image, and a second monotone image from the second image;
(d) using the ISP to project the first monotone image to produce a first one-dimensional profile; and to project the second monotone image to produce a second one-dimensional profile;
(e) using the ISP to extract a matching information from the first and second one-dimensional profiles by matching the second one-dimensional profile to the first one-dimensional profile;
(f) using the ISP to utilize the matching information produce a first processed two-dimensional image, and a second processed two-dimensional image that is aligned with the first processed two-dimensional image.

12. The digital image signal processing method of claim 11, wherein the second camera sensor is configured to obtain the second image that has a wider viewing range than the first image obtained by the first camera sensor.

13. The digital image signal processing method of claim 11, wherein the first and second images are color images that include a multitude of color channels, and wherein step (c) further includes using the ISP to average the multitude of color channels of the first and second images to produce the first and second monotone images.

14. The digital image signal processing method of claim 13, wherein step (c) further includes the using the ISP to crop and produce the first and second monotone images wherein the second monotone image has essentially the same objects as the first monotone image.

15. The digital image signal processing method of claim 11, wherein the first camera sensor and the second camera sensor are positioned along a first direction; and wherein step (d) further includes using the ISP to project the first and second monotone images in the first direction to produce the first and second one-dimensional profiles, wherein the first and second one-dimensional profiles are laid out along a second direction that is orthogonal to the first direction.

16. The digital image signal processing method of claim 15, wherein step (d) further includes using the ISP to integrate the first monotone image in the first direction to produce the first one-dimensional profile, and to integrate the second monotone image in the first direction to produce the second one-dimensional profile.

17. The digital image signal processing method of claim 11, wherein step (e) further includes the following steps:
(i) sampling the first one-dimensional profile to produce a multitude of query set descriptors;
(ii) for each query set descriptor, processing the second one-dimensional profile to obtain a group of candidate set descriptors; subsequently using a local matching method to identify a best-matched candidate set descriptor that is closest in value to the query set descriptor;
(iii) repeating step (ii) to form a multitude of best-matched candidate set descriptors corresponding to the multitude of query set descriptors;
wherein the matching information includes a start and end position information set of the multitude of query set descriptors and the multitude of the best-matched candidate set descriptors.

18. The digital image signal processing method of claim 17, wherein step (i) further includes using the ISP to sample the first one-dimensional profile at a first sampling interval to produce the multitude of query set descriptors, wherein each query set descriptor has a profile length that depends on profile statistics.

19. The digital image signal processing method of claim 18, wherein step (ii) further includes using the ISP to process the second one-dimensional profile to identify the group of candidate set descriptors, wherein each candidate set descriptor has the same profile length as each query set descriptor, and wherein each candidate set descriptor is situated within a local matching range.

20. The digital image signal processing method of claim 11, further including between steps (d) and (e) a step of using the ISP to convert the first one-dimensional profile to a first normalized one-dimensional profile; and to convert the second one-dimensional profile to a second normalized one-dimensional profile; wherein step (e) uses the ISP to extract a matching information from the first and second normalized one-dimensional profiles by matching the second normalized one-dimensional profile to the first normalized one-dimensional profile.

21. A multiple camera imaging system, comprising:
a first camera image sensor configured to obtain a first image of a scene from a first vantage perspective point;
a second camera image sensor configured to obtain a second image of the scene from a second vantage perspective point; and
an image signal processor (ISP), including:
(a) a preliminary processing block configured to produce a first monotone image from the first image, and a second monotone image from the second image;
(b) a one-dimensional projection block configured to project the first monotone image to produce a first one-dimensional profile; and to project the second monotone image to produce a second one-dimensional profile;
(c) an optional normalization block configured to convert the first one-dimensional profile to a first normalized one-dimensional profile; and to convert the second one-dimensional profile to a second normalized one-dimensional profile;
(d) a sampling block configured to sample the first one-dimensional profile to produce a multitude of query set descriptors; and with regard to each query set descriptor, configured to process the second one-dimensional profile to identify a group of candidate set descriptors;

(e) a local matching block configured to use a local matching method to identify a best-matched candidate set descriptor that is closest in value to the query set descriptor; and repeat to form a multitude of the best-matched candidate set descriptors corresponding to the multitude of query set descriptors;

(f) a modeling-rectification block configured to use the multitude of query set descriptors and the multitude of the best-matched candidate set descriptors to produce a first processed two-dimensional image, and a second processed two-dimensional image that is aligned with the first processed two-dimensional image.

22. The multiple camera imaging system of claim 21, wherein the second camera sensor is configured to obtain the second image that has a wider viewing range than the first image obtained by the first camera sensor.

23. The multiple camera imaging system of claim 21, wherein the first camera sensor and the second camera sensor are positioned along a first direction; and wherein the one-dimensional projection block is further configured to project the first and second monotone images in the first direction to produce the first and second one-dimensional profiles, wherein the first and second one-dimensional profiles are laid out along a second direction that is orthogonal to the first direction.

24. The multiple camera imaging system of claim 23, wherein the one-dimensional projection block is further configured to integrate the first monotone image in the first direction to produce the first one-dimensional profile, and to integrate the second monotone image in the first direction to produce the second one-dimensional profile.

* * * * *